United States Patent [19]
Berezin et al.

[11] 3,883,553
[45] May 13, 1975

[54] DICYCLOALKANO [E,G] TETRAHYDROISOINDOLINES

[75] Inventors: Gilbert H. Berezin, West Chester, Pa.; Walter E. Meier, Wilmington, Del.

[73] Assignee: E. I. du Pont de Nemours & Company, Wilmington, Del.

[22] Filed: Dec. 26, 1972

[21] Appl. No.: 318,468

Related U.S. Application Data

[63] Continuation of Ser. No. 77,312, Oct. 1, 1970, abandoned.

[52] U.S. Cl............ 260/326.1; 260/326 C; 424/274
[51] Int. Cl............................................ C07d 27/48
[58] Field of Search................................. 260/326.1

[56] References Cited
OTHER PUBLICATIONS

Burger, *Medicinal Chemistry* Part 1, page 662, (3rd ed.) 1970.

*Primary Examiner*—Joseph A. Narcavage

[57] ABSTRACT

Certain N-substituted tetrahydroisoindolines having cyclopentano, cyclohexano, or cycloheptano substituents in the e- and g-positions are effective antirhinoviral agents. The new compounds can be made from the appropriate dicycloalkanotetrahydrophthalic anhydrides by reaction with amines, followed by reduction; from the appropriate dicycloalkanotetrahydroisoindolines and halo compounds; or, in one particular case, from a dicycloalkanotetrahydroisoindoline and allene.

3 Claims, No Drawings

DICYCLOALKANO [E,G] TETRAHYDROISOINDOLINES

CROSS REFERENCE TO RELATED APPLICATION

This application is a continuation of our copending application Ser. No. 77,312, filed Oct. 1, 1970.

BACKGROUND OF THE INVENTION

1. Field of the Invention

This invention relates to a new class of dicycloalkano-[e,g]tetrahydroisoindolines and to their use as antirkinoviral agents.

2. Prior Art

Certain hydrogenated dibenz[e,g]isoindoline derivatives have been reported by Rice and Crogen, J. Med. Chem. 11, 185 (1968). These compounds can be represented by the general formula (1)

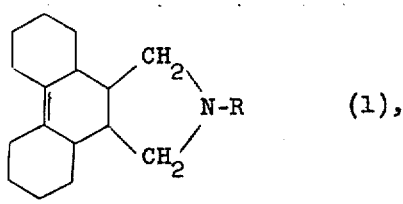

in which

R is 3-dimethylaminopropyl, 2-dimethylaminoethyl, or 3-morpholinopropyl. All were inactive against lymphoid leukemia. The dimethiodide of one of the above compounds produced ganglionic blockage in cat and gave a moderate reduction of blood pressure in dog.

Rhinoviruses endanger the health of many warm-blooded animals and these viruses have never been completely controlled. There is a continuing need for effective antirhinoviral agents.

SUMMARY OF THE INVENTION

According to this invention, it has now been discovered that certain novel dicycloalkano[e,g]tetrahydroisoindolines are effective in warm-blooded animals against viruses such as rhino viruses. The term "warm-blooded animals" is used to identify those members of the animal kingdom which have a homeostatic mechanism. These novel compounds can be represented by the following formula (2)

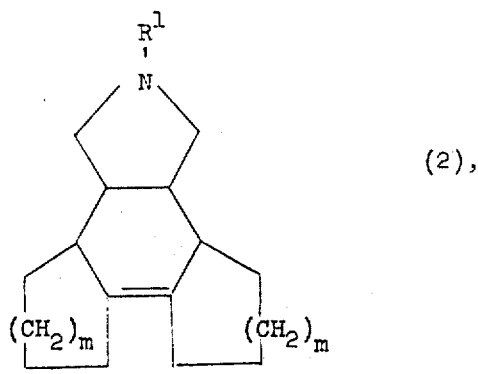

in which $m$ can be 0, 1 or 2; and $R^1$ can be:

a. benzyl or substituted benzyl in which the substituent can be one or more ring fluorine, chlorine and bromine atoms, methyl groups, or methoxy groups; or one α-methyl group; or b. thenyl, methoxyethyl, ethoxyethyl, methylthioethyl, ethylthioethyl, ethylthiopropyl, cyclopropylmethyl, allyl, methallyl, dimethallyl, 3-methyl-2-methylene-3-butenyl, or propargyl.

Instead of the above free dicycloalkano[e,g]isoindolines, their addition salts with pharmaceutically acceptable organic and inorganic acids can be used as antirhinoviral agents.

The new compounds of the present invention can be prepared by (a) aminolysis of the appropriate tetrahydrophthalic anhydride, followed by reduction with a mixed metal hydride; (b) reaction of the appropriate tetrahydroisoindoline with a halo compound; or (c) catalytic reaction of the tetrahydroisoindoline with allene, which introduces the 3-methyl-2-methylene-3-butenyl substituent.

DETAILED DESCRIPTION OF THE INVENTION

Depending on the value of $m$ in formula (2), the novel compounds are N-substituted dicyclopentano-, dicyclohexano-, or dicycloheptano[e,g]tetrahydroisoindolines and their addition salts.

In the first process for the preparation of these compounds, a 3,4,5,6-dicycloalkano-1,2,3,6-tetrahydrophthalic anhydride is contacted with the appropriate amine at a temperature between about 150°C. and the decomposition temperature of the imide formed in the reaction. The preferred temperature range is about 180°–820°C. Any suitable mixed metal hydride, such as lithium aluminum hydride, can be used to reduce the carbonyl groups to the methylene groups. This reaction sequence is shown below in Equation (1)

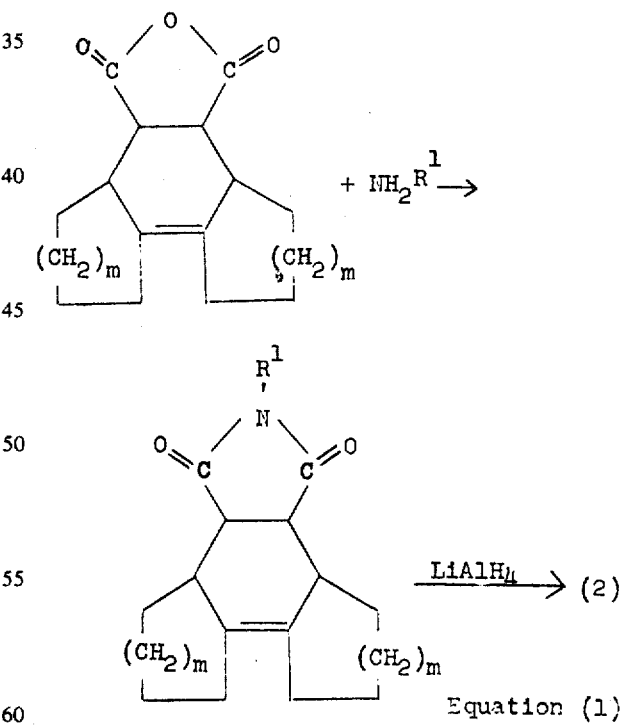

Equation (1)

The starting 3,4,5,6-dicycloalkano-1,2,3,6-tetrahydrophthalic anhydride can be made in the fashion shown by Greidingen and Grinsberg, J. Org. Chem., vol. 22, 1406 (1957). The amines are readily available commerical products.

In the initial phase of the reaction, an inert solvent can be used to dissolve the reactants and bring them into intimate contact with each other.

The solvent is then distilled off, and the residue is heated at the proper temperature in an inert atmosphere until the imide is formed. An inert solvent is a solvent which does not react with either one of the reactants, and especially with the 3,4,5,6-dicycloalkano-1,2,3,6-tetrahydrophthalic anhydride. Solvents having active hydrogen atoms, e.g. water, alcohols, or competing primary and secondary amines are unsuitable.

Suitable solvents include aliphatic and aromatic hydrocarbons; halogenated hydrocarbons; linear and cyclic ethers such as diethyl ether, dibutyl ether, dioxane, and tetrahydrofuran; and certain highly polar solvents such as dimethylformamide, dimethylacetamide, and dimethyl sulfoxide.

The above process cannot be used when $R^1$ is the propargyl radical because such radical is readily reduced to the allyl group under the reaction conditions. When $R^1$ is a halobenzyl radical, this process gives low yields of the desired product because of a dehalogenation side reaction which leads to the unsubstituted benzyl byproduct.

In the second process, a mixture of a dicycloalkano[e,g]tetrahydroisoindoline with the appropriate halocompound and an additional base is heated in a solvent at a temperature of about 30° to 100°C. for about 1–2 hours. The preferred temperature is about 45°–55°C. and the reaction time about 1.5 hours. Stoichiometric amounts of the reactants give satisfactory yields, but an excess of either one can be used.

The starting dicycloalkano[e,g]tetrahydroisoindoline can be prepared from the appropriate phthalic anhydride which is allowed to react with urea or ammonia, and the resulting imide is reduced to the isoindoline. Because use of ammonia results in lower yields, due to side reactions, urea is preferred. The starting halo compounds are commercially available from several sources.

The additional base is an inorganic or organic base which serves as a proton acceptor in this reaction. A suitable base can be, for example, an alkali metal bicarbonate or carbonate, a cationic ion exchange resin, or a tertiary amine such as triethylamine or N,N-dimethylaniline. The alkali metal carbonate or bicarbonate in the presence of dimethylformamide as the solvent is much preferred because of the ease of reaction and purity of products. The amount of this additional base should be stoichiometric with the amount of the hydrohalic acid formed in the reaction. The reaction proceeds according to the following Equation (2):

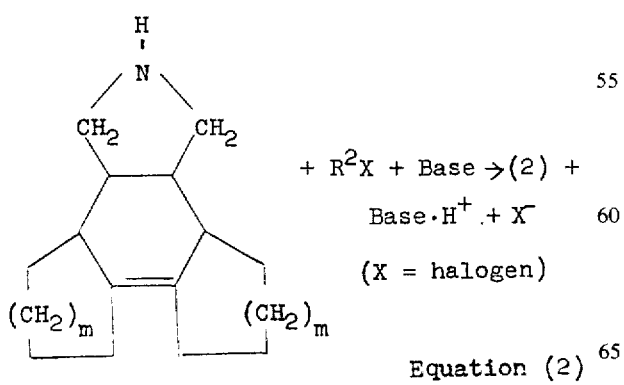

Equation (2)

Suitable reaction solvents are preferably polar aprotic solvents, such as N,N-dimethylformamide, N,N-dimethylacetamide, and dimethyl sulfoxide.

The third process follows the Equation (3), below:

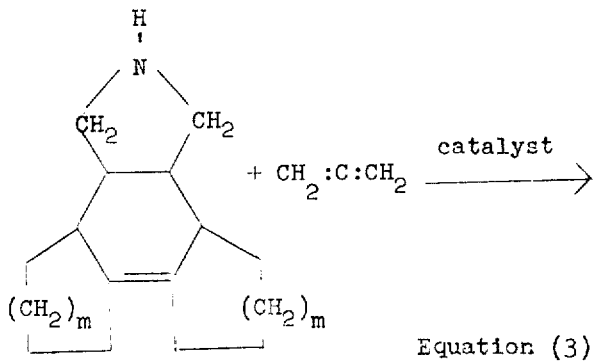

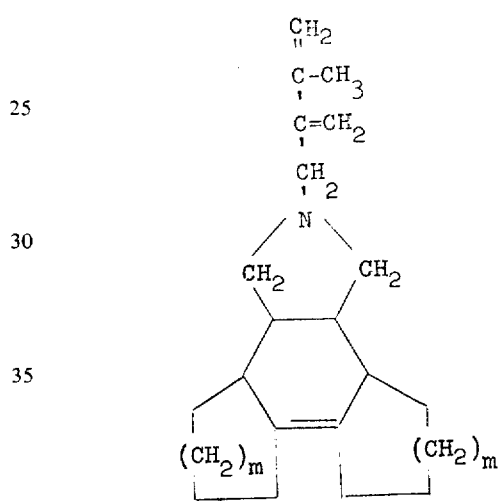

Equation (3)

The catalyst is a bis(triphenylphosphinepalladium)-/maleic anhydride complex, which can be prepared according to the teachings of S. Takahashi et al., Nippon Kagaku Zasshi, 88, 1306 (1967). The reaction with allene is carried out in an inert solvent such as, for example, an aromatic or aliphatic hydrocarbon or a halohydrocarbon, in a closed vessel and within a temperature range of about 80° to 150°C. The preferred temperature range is 110°–130°C. At a temperature of 120°C., the reaction requires about 6 hours, although longer or shorter periods are entirely feasible.

Addition salts of dicycloalkano[e,g]tetrahydroisoindolines of the present invention with pharmaceutically acceptable, i.e. nontoxic, acids can be made by neutralizing solutions of the free dicycloalkano[e,g]tetrahydroisoindolines with appropriate acids. Representative suitable acids include hydrochloric, hydrobromic, hydroiodic, sulfuric, nitric, phosphoric, acetic, maleic, citric, propionic, benzoic oleic, and succinic acids. The neutralization step can be carried out either in an aqueous solution or in a solution in an organic solvent, such as diethyl ether or ethyl alcohol. The addition salt is recovered either by filtration (if it is insoluble in the liquid medium) or by evaporation of the solvent.

This invention is now illustrated by the following examples of certain preferred embodiments thereof, wherein all parts, proportions and percentages are by weight unless otherwise indicated.

EXAMPLE 1

To a solution of six grams of 3,4,5,6-dicycloheptano-1,2,3,6-tetrahydrophthalic anhydride in methylene chloride there is added 2.2 g. of benzylamine. The solvent is removed and the residue heated in a 190°C. bath for 45 minutes under nitrogen. Ethanol is added to the hot, melted reaction product. The mixture is cooled and the resultant solid is collected by filtration to yield N-benzyl-3,4,5,6-dicycloheptano-1,2,3,6-tetrahydrophthalimide.

Four grams of this material is added to 4 grams of lithium aluminum hydride in 100 ml. of tetrahydrofuran. The reaction mixture is refluxed for 16 hours, and the excess hydrides are decomposed with an aqueous saturated sodium sulfate solution. The solid is removed by filtration and washed with tetrahydrofuran. The filtrates are combined and concentrated under vacuum. The residue is taken up in ether; the ether solution is dried over potassium hydroxide pellets and decanted. Hydrogen chloride gas is passed into the ether until precipitation is complete. The product is collected by filtration, dried, and recrystallized from butanol to yield 2.5 g. of 2-benzyldicycloheptano[e,g]3a,3b,13a,13b-tetrahydroisoindoline hydrochloride, m.p. 333°C., decomposition.

EXAMPLES 2–24

Substitution of other 3,4,5,6-dicycloalkano-1,2,3,6-tetrahydrophthalic anhydrides for 3,4,5,6-dicycloheptano-1,2,3,6-tetrahydrophthalic anhydride and of an equimolar amount of another amine for benzylamine in the process of Example 1 will yield the corresponding products having the general formula (2). These data are presented below in Table I.

TABLE I

| Ex. | 3,4,5,6-Dicycloalkano-1,2,3,6-tetrahydrophthalic Anhydride | Amine | Product |
|---|---|---|---|
| 2 | 3,4,5,6-dicyclohexano-1,2,3,6-tetrahydrophthalic anhydride | benzylamine | 2-benzyldicyclohexano[e,g]3a,3b,11a,11b,-tetrahydroisoindoline hydrochloride |
| 3 | 3,4,5,6-dicyclohexano-1,2,3,6-tetrahydrophthalic anhydride | allylamine | 2-allyldicyclohexano[e,g,]3a,3b,11a,11b,-tetrahydroisoindoline hydrochloride |
| 4 | 3,4,5,6-dicyclopentano-1,2,3,6-tetrahydrophthalic anhydride | benzylamine | 2-benzyldicyclopentano[e,g]3a,3b,9a,9b,-tetrahydroisoindoline hydrochloride |
| 5 | 3,4,5,6-dicycloheptano-1,2,3,6-tetrahydrophthalic anhydride | allylamine | 2-allyldicycloheptano[e,g]3a,3b,13a,13b,-tetrahydroisoindoline hydrochloride |
| 6 | 3,4,5,6-dicycloheptano-1,2,3,6-tetrahydrophthalic anhydride | o-methylbenzylamine | 2-(o-methylbenzyl)dicycloheptano[e,g]-3a,3b,13a,13b-tetrahydroisoindoline hydrochloride |
| 7 | 3,4,5,6-dicycloheptano-1,2,3,6-tetrahydrophthalic anhydride | p-methoxybenzylamine | 2-(p-methoxybenzyl)dicycloheptano[e,g]-3a,3b,13a,13b-tetrahydroisoindoline hydrochloride |
| 8 | 3,4,5,6-dicycloheptano-1,2,3,6-tetrahydrophthalic anhydride | α-methylbenzylamine | 2-(α-methylbenzyl)dicycloheptano[e,g]-3a,3b,13a,13b-tetrahydroisoindoline hydrochloride |
| 9 | 3,4,5,6-dicycloheptano-1,2,3,6-tetrahydrophthalic anhydride | thenylamine | 2-thenyldicycloheptano[e,g]3a,3b,13a,13b,-tetrahydroisoindoline hydrochloride |
| 10 | 3,4,5,6-dicycloheptano-1,2,3,6-tetrahydrophthalic anhydride | methoxyethylamine | 2-methoxyethyldicycloheptano[e,g]3a,3b 13a,13b-tetrahydroisoindoline hydrochloride |
| 11 | 3,4,5,6-dicycloheptano-1,2,3,6-tetrahydrophthalic anhydride | ethylthioethylamine | 2-ethylthioethyldicycloheptano[e,g]3a,3b-13a,13b-tetrahydroisoindoline hydrochloride |
| 12 | 3,4,5,6-dicyclohexano-1,2,3,6-tetrahydrophthalic anhydride | cyclopropylmethylamine | 2-cyclopropylmethyldicyclohexano[e,g]-3a,3b,11a,11b-tetrahydroisoindoline hydrochloride |
| 13 | 3,4,5,6-dicyclohexano-1,2,3,6-tetrahydrophthalic anhydride | methallylamine | 2-methallyldicyclohexano[e,g]3a,3b,11a,-11b-tetrahydroisoindoline hydrochloride |
| 14 | 3,4,5,6-dicyclohexano-1,2,3,6-tetrahydrophthalic anhydride | dimethallylamine | 2-dimethallyldicyclohexano[e,g]3a,3b,11a,-11b-tetrahydroisoindoline hydrochloride |
| 15 | 3,4,5,6-dicyclohexano-1,2,3,6-tetrahydrophthalic anhydride | ethoxyethylamine | 2-ethoxyethyldicyclohexano[e,g]3a,3b,11a,-11b-tetrahydroisoindoline hydrochloride |
| 16 | 3,4,5,6-dicyclohexano-1,2,3,6-tetrahydrophthalic anhydride | methylthioethylamine | 2-methylthioethyldicyclohexano[e,g]3a,3b,-11a,11b-tetrahydroisoindoline hydro- |
| 17 | 3,4,5,6-dicyclohexano-1,2,3,6-tetrahydrophthalic anhydride | m-methylbenzylamine | 2-(m-methylbenzyl)dicyclohexano[e,g]-3a,3b,11a,11b-tetrahydroisoindoline hydrochloride |
| 18 | 3,4,5,6-dicyclopentano-1,2,3,6-tetrahydrophthalic anhydride | ethylthioethylamine | 2-ethylthioethyldicyclopentano[e,g]-3a,3b,9a,9b-tetrahydroisoindoline hydrochloride |
| 19 | 3,4,5,6-dicyclopentano-1,2,3,6-tetrahydrophthalic anhydride | ethylthiopropylamine | 2-ethylthiopropyldicyclopentano[e,g]-3a,3b,9a,9b-tetrahydroisoindoline hydrochloride |
| 20 | 3,4,5,6-dicyclopentano-1,2,3,6-tetrahydrophthalic anhydride | p-methylbenzylamine | 2-(p-methylbenzyl)dicyclopentano[e,g]-3a,3b,9a,9b-tetrahydroisoindoline hydrochloride |
| 21 | 3,4,5,6-dicyclopentano-1,2,3,6-tetrahydrophthalic anhydride | o-methoxybenzylamine | 2-(o-methoxybenzyl)dicyclopentano[e,g]-3a,3b,9a,9b-tetrahydroisoindoline hydrochloride |
| 22 | 3,4,5,6-dicyclopentano-1,2,3,6-tetrahydrophthalic anhydride | m-methoxybenzylamine | 2-(m-methoxybenzyl)dicyclopentano[e,g]-3a,3b,9a,9b-tetrahydroisoindoline hydrochloride |
| 23 | 3,4,5,6-dicyclopentano-1,2,3,6-tetrahydrophthalic anhydride | allylamine | 2-allyldicyclopentano[e,g]3a,3b,9a,9b-tetrahydroisoindoline hydrochloride |
| 24 | 3,4,5,6-dicyclopentano-1,2,3,6-tetrahydrophthalic anhydride | dimethallylamine | 2-dimethallyldicyclopentano[e,g]-3a,3b,9a,9b-tetrahydroisoindoline hydrochloride |

EXAMPLE 25

A mixture of 25 g. of 3,4,5,6-dicycloheptano-1,2,3,6-tetrahydrophthalic anhydride and 35 g. of urea is heated in a 180°C. bath for 1 hour. Water and dichloromethane are added to the reaction mixture. The water is separated and extracted with dichloromethane. The dichloromethane portions are combined and concentrated to dryness. The residue can be recrystallized from ethanol to yield 10.1 g. of 3,4,5,6-dicycloheptano-1,2,3,6-tetrahydrophthalimide, m.p. 166°–169°C. Ten grams of 3,4,5,6-dicycloheptano-1,2,3,6-tetrahydrophthalimide is added to 10 g. of lithium aluminum hydride in 200 ml. of tetrahydrofuran and the mixture is refluxed for 16 hours. The excess hydride is decomposed by the dropwise addition of a saturated aqueous solution of sodium sulfate. The solid is filtered off and washed with tetrahydrofuran. The filtrates are combined and concentrated under vacuum. The residue is distilled, and the fraction distilling at 150°–157°C. and 0.65 mm is collected to yield 7.7 g. of dicycloheptano[e,g]3a,3b,13a,13b-tetrahydroisoindoline, m.p. 49°–52°C.

EXAMPLE 26

Substitution of 3,4,5,6-dicyclohexano-1,2,3,6-tetrahydrophthalic anhydride for 3,4,5,6-dicycloheptano-1,2,3,6-tetrahydrophthalic anhydride in the process of Example 25 yields dicyclohexano[e,g]3a,3b,11a,11b-tetrahydroisoindoline.

EXAMPLE 27

Substitution of 3,4,5,6-dicyclopentano-1,2,3,6-tetrahydrophthalic anhydride for 3,4,5,6-dicycloheptano-1,2,3,6-tetrahydrophthalic anhydride in Example 25 yields dicyclopentano[e,g]3a,3b,9a,9b-tetrahydroisoindoline.

EXAMPLE 28 o-Fluorobenzyl chloride (2.9 g.) is added to a mixture of 3 g. of potassium carbonate and 4.3 g. of dicycloheptano[e,g]3a,3b,13a,13b-tetrahydroisoindoline in 50 ml. of dimethylformamide. The mixture is heated at 50° for 2 hours and poured into 300 ml. of water. The water is extracted with three 100 ml. portions of diethyl ether. The ether extracts are combined and backwashed with water. The ether solution is dried over anhydrous potassium carbonate. The ether is filtered and the filtrate concentrated under vacuum to yield 2-(o-fluorobenzyl)dicycloheptano[e,g]3a,3b,13a,13b-tetrahydroisoindoline.

EXAMPLES 29–43

Substitution of the following dicycloalkano[e,g]tetrahydroisoindolines for dicycloheptano[e,g]3a,3b,13a,13b-tetrahydroisoindoline and substitution of an equimolar amount of the indicated halo compound for o-fluorobenzyl chloride in the process of Example 28 will yield the indicated products as shown in Table II.

TABLE II

| Ex. | Isoindoline | Halocompound | Product |
|---|---|---|---|
| 29 | dicycloheptano[e,g]3a,3b,13a,13b-tetrahydroisoindoline | m-fluorobenzyl chloride | 2-(m-fluorobenzyl)dicycloheptano[e,g]-3a,3b,13a,13b-tetrahydroisoindoline |
| 30 | dicycloheptano[e,g]3a,3b,13a,13b-tetrahydroisoindoline | propargyl bromide | 2-propargyldicycloheptano[e,g]3a,3b,-13a,13b-tetrahydroisoindoline |
| 31 | dicycloheptano[e,g]3a,3b,13a,13b-tetrahydroisoindoline | p-chlorobenzyl chloride | 2-(p-chlorobenzyl)dicycloheptano[e,g]-3a,3b,13a,13b-tetrahydroisoindoline |
| 32 | dicycloheptano[e,g]3a,3b,13a,13b-tetrahydroisoindoline | o-bromobenzyl bromide | 2-(o-bromobenzyl)dicycloheptano[e,g]-3a,3b,13a,13b-tetrahydroisoindoline |
| 33 | dicyclohexano[e,g]3a,3b,11a,11b-tetrahydroisoindoline | p-fluorobenzyl chloride | 2-(p-fluorobenzyl)dicyclohexano[e,g]-3a,3b,11a,11b-tetrahydroisoindoline |
| 34 | dicyclohexano[e,g]3a,3b,11a,11b-tetrahydroisoindoline | o-fluorobenzyl chloride | 2-(o-fluorobenzyl)dicyclohexano[e,g]-3a,3b,11a,11b-tetrahydroisoindoline |
| 35 | dicyclohexano[e,g]3a,3b,11a,11b-tetrahydroisoindoline | m-bromobenzyl bromide | 2-(m-bromobenzyl)dicyclohexano[e,g]-3a,3b,11a,11b-tetrahydroisoindoline |
| 36 | dicyclohexano[e,g]3a,3b,11a,11b-tetrahydroisoindoline | o-chlorobenzyl chloride | 2-(o-chlorobenzyl)dicyclohexano[e,g]-3a,3b,11a,11b-tetrahydroisoindoline |
| 37 | dicyclohexano[e,g]3a,3b,11a,11b-tetrahydroisoindoline | m-chlorobenzyl chloride | 2-(m-chlorobenzyl)dicyclohexano[e,g]-3a,3b,11a,11b-tetrahydroisoindoline |
| 38 | dicyclohexano[e,g]3a,3b,11a,11b-tetrahydroisoindoline | propargyl bromide | 2-propargyldicyclohexano[e,g]-3a,3b,11a,11b-tetrahydroisoindoline |
| 39 | dicyclopentano[e,g]3a,3b,9a,9b-tetrahydroisoindoline | propargyl bromide | 2-propargyldicyclopentano[e,g]-3a,3b,9a,9b-tetrahydroisoindoline |
| 40 | dicyclopentano[e,g]3a,3b,9a,9b-tetrahydroisoindoline | o-fluorobenzyl chloride | 2-(o-fluorobenzyl)dicyclopentano[e,g]-3a,3b,9a,9b-tetrahydroisoindoline |
| 41 | dicyclopentano[e,g]3a,3b,9a,9b-tetrahydroisoindoline | m-fluorobenzyl chloride | 2-(m-fluorobenzyl)dicyclopentano[e,g]-3a,3b,9a,9b-tetrahydroisoindoline |
| 42 | dicyclopentano[e,g]3a,3b,9a,9b-tetrahydroisoindoline | p-bromobenzyl bromide | 2-(p-bromobenzyl)dicyclopentano[e,g]-3a,3b,9a,9b-tetrahydroisoindoline |
| 43 | dicyclopentano[e,g]3a,3b,9a,9b-tetrahydroisoindoline | o-chlorobenzyl chloride | 2-(o-chlorobenzyl)dicyclopentano[3,g]-3a,3b,9a,9b-tetrahydroisoindoline |

EXAMPLE 44

Two hundred milligrams of bis(triphenylphosphinepalladium)/maleic anhydride complex [S. Takahashi et al., Nippon Kagaku Zasshi, 88, 1306 (1967)] is added to a solution of 15.5 g. of dicycloheptano[e,g]3a,3b,13a,13b-tetrahydroisoindoline in 100 ml. of benzene. The solution is placed in an autoclave to which is added 5.2 g. of allene. The autoclave is heated with shaking at 120°C. for 6 hours. At the end of this period the reaction mixture is decanted and filtered, and the filtrate is evaporated at a reduced pressure. The residue is taken up in ether, and hydrogen chloride gas is passed into the ether until the ether is just neutral. The hydrochloride is collected and can be purified by recrystallization from ethanol-ether to give 2-(3-methyl-2-methylene-3-butenyl)-dicycloheptano[e,g]3a, 3b, 13a, 13b- tetrahydroisoindoline hydrochloride.

EXAMPLE 45

Substitution of dicyclohexano[e,g]3a,3b,11a,11b-tetrahydroisoindoline for dicycloheptano[e,g]3a,3b,13a,13b-tetrahydroisoindoline in the process of Example 44 yields 2-(3-methyl-2-methylene-3-butenyl)-dicyclohexano[e,g]3a,3b,11a,11b-tetrahydroisoindoline hydrochloride.

EXAMPLE 46

Substitution of dicyclopentano[e,g]3a,3b,9a,9b-tetrahydroisoindoline for dicycloheptano[e,g]3a,3b,13a,13b-tetrahydroisoindoline in the process of Example 44 yields 2-(3-methyl-2-methylene-3-butenyl)-dicyclopentano[e,g]3a,3b,9a,9b-tetrahydroisoindoline hydrochloride.

The activity of representative dicycloalkano[e,g]tetrahydroisoindolines was tested both in vitro and in vivo against rhinovirus. These pharmacological data are presented below in Examples 47–53.

Methodology and state of the art of tissue culture, as used in the examples, can be found in the following references:

R. C. Parker, Methods of Tissue Culture, 3rd. Edition, 1961, P. B. Hoeber, Inc.

T. M. Bell, Introduction to General Virology, 1965, J. B. Lippincott Co.

S. Frankel and S. Reitman, Editors, Gradwahl's Clinical Laboratory Methods and Diagnosis, Volume 1, 1963, C. V. Mosby & Co.

D. Hamre, Rhinoviruses, Monographs in Virology, 1968, S. Karger, New York

The following procedure was used for the tissue culture antiviral activity tests:

EXAMPLE 47

1. HeLa cells, grown to confluency as a monolayer in standard 60-mm plastic tissue culture dishes, are infected with rhinovirus, type 2/HGP. Approximately 100 plaque-forming units (PFU's) of virus are applied to the washed cell layer. After a 90-minute infection period, the excess virus is removed, the cell layer washed, and a 5-ml. mixture of agar and nutrient medium is applied. When the agar layer is hard, a solution of 2-benzyldicycloheptano[e,g]3a,3b,13a,13b-tetrahydroisoindoline of Example 1 is applied in a 1-ml. amount to the surface of the agar. The final concentration of compound is varied to provide the amounts of 50 mcg/ml, 10 mcg/ml and 2 mcg/ml. The plates are then incubated for 5 days at 34°C. in a water-saturated 95 percent air, 5 percent $CO_2$ incubator. When incubation is complete, the plates are removed and stained to reveal the presence of plaques (holes in the cell layer caused by virus; 1 plaque is equivalent to 1 virus particle, or one plaque-forming unit).

The results of this test are as follows:

|  | PFU's Counted |
|---|---|
| Test compound at 50 mcg/ml | 0 |
| Test compound at 10 mcg/ml | 10 |
| Test compound at 2 mcg/ml | 90 |
| Control —medium only | 110 |

These results shown that 2-benzyl-dicycloheptano[e,g]3a,3b,13a,13b-tetrahydroisoindoline hydrochloride completely suppresses virus replication at 50 mcg/ml and partially inhibits replication at 10 mcg/ml. At 2 mcg/ml, the number of PFU's is not significantly different from the controls.

It is concluded that this compound is an effective agent against rhinovirus 2/HGP.

EXAMPLE 48

Using the same method as in Example 47, the virus was substituted by rhinovirus type 14/1059. The following results were obtained:

|  | PFU's Counted |
|---|---|
| Test compound at 50 mcg/ml | 0 |
| Test compound at 10 mcg/ml | 0 |
| Test compound at 2 mcg/ml | 75 |
| Controls | 105 |

It is concluded that 2-benzyl-dicycloheptano[e,g]3a,3b,13a,13b-tetrahydroisoindoline hydrochloride effectively inhibits type 14/1059 at 50 and 10 mcg/ml, but only slightly at 2 mcg/ml.

EXAMPLE 49

Using the method of Example 47, the following five additional types of rhinovirus were found to be inhibited by 2-benzyl-dicycloheptano[e,g]3a,3b,13a,13b-tetrahydroisoindoline:

| Rhinovirus Type | Minimum Inhibitory Concentrations* (mcg/ml) |
|---|---|
| 1B/B632 | 1.0 |
| 3/FEB | 0.1 |
| 5/Norman | 3.2 |
| 39/209 | 1.0 |
| 51/FO-1 | 1.0 |

*Minimum inhibitory concentration is the lowest concentration required to suppress plaque formation by 50%, in this case from 100 to 50 PFU's.

It is concluded from the above data that the compound significantly suppresses virus replication at practical concentrations.

EXAMPLE 50

Using the method of Example 47, 2-ethylthioethyldicycloheptano[e,g]3a,3b,13a,13b-tetrahydroisoindoline was applied to the surface of agar. The following results were obtained:

| Rhinovirus Type | Minimum Inhibitory Concentration (mcg/ml) |
|---|---|
| 2/HGP | 10.0 |
| 51/FO-1 | 2.0 |
| 39/209 | 2.0 |

It is concluded that this compound has significant antiviral activity against these three types of rhinovirus.

EXAMPLE 51

Using the method of Example 47, 2-allyl-dicycloheptano[e,g]3a,3b,13a,13b-tetrahydroisoindoline hydrochloride was applied to the surface of agar, and the following minimum inhibitory concentration were found:

| Rhinovirus Type | Minimum Inhibitory Concentration (mcg/ml) |
|---|---|
| 29/209 | 2.0 |
| 14/1059 | 2.0 |
| 2/HGP | 2.0 |

This compound is found to have highly significant antiviral activity in tissue culture.

While it has always been difficult to perform tests against rhinovirus in experimental animals, a species of rhinovirus, equine respiratory virus, isolated from horses, will multiply in the lungs of hamster, a warm-blooded animal, but without causing symptoms. The virus can be detected in infected animals by removing the lungs and testing for the presence of virus in a tissue culture system.

The in vivo test with 2-benzyl-dicycloheptano[e,g]3a,3b,13a,13b-tetrahydroisoindoline was carried out as follows:

EXAMPLE 52

Two groups of female hamsters were inoculated intranasally with 10,000 plaque-forming units (PFU) of the Plummer strain of equine rhinovirus. The treated group received 1 mg/ml of 2-benzyl-dicycloheptano[e,g]3a,3b,13a,13b-tetrahydroisoindoline in 1.8 percent methylcellulose in the drinking water starting 3 days prior to infection and continuing until the time of sacrifice for lung harvest. The control group received 1.8 percent methylcellulose in the drinking water alone. Two days after intranasal infection the animals were sacrificed and the virus titer in lungs was determined. One additional group received 1.8 percent methylcellulose in the drinking water but was infected with 1/10 as much virus (1000 PFU) as the other two groups (10,000 PFU). Final titers were calculated as PFU per gram of lung tissue. The results are shown below:

| Hamster Number[1] | Test Compound | ERV/P Lung Titer[2,4] C | C/10 |
|---|---|---|---|
| | | PFU/lung, $\log_{10}$ | |
| 1 | 2.87 | 4.96 | 4.61 |
| 2 | <1.82 | 3.18 | 5.57 |
| 3 | <1.82 | 4.69 | 4.32 |
| 4 | <1.82 | 3.89 | 4.76 |
| 5 | <1.82 | <1.82 | 5.11 |
| 6 | 3.52 | 4.89 | <1.82 |
| 7 | 2.60 | 3.67 | 4.52 |
| 8 | <1.82 | 5.74 | 4.20 |
| 9 | 2.42 | 5.23 | 4.08 |
| 10 | 2.97 | 5.57 | <1.82 |
| 11 | 5.52 | 4.97 | <1.82 |
| 12 | 4.03 | 4.91 | <1.82 |
| 13 | 2.87 | 5.90 | 4.98 |
| 14 | 4.52 | 3.18 | 2.41 |
| 15 | <1.82 | 5.40 | 4.49 |
| 16 | <1.82 | 5.20 | <1.82 |
| Average | 2.79 | 4.57 | 3.63 |
| Probability of Difference from Control[5] | $p < 0.001$ | — | $p < 0.025$ |

[1] Lakeview Hamstry, females, 22 days of age.
[2] Lungs harvested 2 days after intranasal infection with 10,000 PFU of ERV/P in 100 μl inoculum under 2-bromo-2-chloro-1,1,1-trifluoroethane anesthesia (C/10 group received 1,000 PFU of virus).
[3] Test compound administered as a micronized suspension in 1.8% methylcellulose at 1 mg/ml from day −3 to +2; controls received 1.0% methylcellulose.
[4] Virus titer determined on C-HeLa monolayers; least detectable amount was 1.82 logs per tissue; <1.82 means not detectable.
[5] Mann-Whitney "U" Test.

It is evident that treatment with the test compound resulted in fewer animals with determinable lung titers of virus, as well as having a lower average lung titer ($p<0.001$), than the comparable control and also lower than that in control group receiving 1/10 as much inoculum.

EXAMPLE 53

Coronaviruses

Coronaviruses have been isolated from nasopharyngeal washings of subjects with acute upper respiratory disease, and it is becoming apparent that these viruses are an important cause of such disease. One strain (229E) has been grown in tissue culture and found to be inhibited by 2-benzyl-dicycloheptano[e,g]3a,3b,13a,13b-tetrahydroisoindoline at 1 to 3 mcg/ml in tests similar to those described for the rhinoviruses.

The compounds of formula (2) above can be administered in the antiviral treatment according to this invention by any means that effects contact of the active compound with the site of virus infection in the body of a warm-blooded animal. It will be understood that this include the site prior to infection as well as thereafter. For example, administration can be parenterally, that is subcutaneously, intravenously, intramuscularly, or intraperitoneally. Alternatively or concurrently, the compounds are effective on administration by the oral route or by administration as aerosol, vapor, or spray through the mouth or nasal passages.

The compounds within the scope of this invention are valuable for viral prophylaxis, as well as for therapeutic treatment.

The dosage administered will be dependent upon the virus being treated, the age, health and weight of the recipient, the extent of infection, kind of concurrent treatment if any, frequency of treatment, and the nature of the effect desired. Generally, a daily dosage of active ingredient compound will be from about 0.1 to 50 milligrams per kilogram of body weight, although lower or higher amounts can be used. Ordinarily, 0.5 to 5 milligrams per kilogram per day, in one or more applications per day, is effective to obtain the desired result.

The active ingredient of formula (2) can be employed in useful compositions according to the present invention in such dosage forms as tablets, capsules, powder packets, or liquid solutions, suspensions, or elixirs, for oral administration or liquid solutions for parenteral use, and in certain cases suspensions for parenteral use (except intravenous). In such compositions the active ingredient will ordinarily always be present in an amount of at least 0.5 percent by weight based on the total weight of the composition and not more than 90 percent by weight.

Besides the active ingredient of formula (2) the antiviral composition will contain a solid or liquid nontoxic pharmaceutical carrier for the active ingredient.

In one embodiment of a pharmaceutical composition of this invention, the solid carrier is a capsule which can be of the ordinary gelatin type. In another embodiment, the active ingredient is tableted with or without adjuvants. In yet another embodiment, the active ingredient is placed into powder packets. The active ingredient of Formula (2) of the capsules, tablets and powders will generally constitute from about 1 to 90 percent and preferably from 5 to 85 percent by weight, the remainder being an inert carrier. These dosage forms preferably contain from about 5 to about 500 milligrams of active ingredient, about 25 mg. to about 250 mg. being most preferred.

The pharmaceutical carrier can be a sterile liquid such as water and oils, including those of petroleum, animal, vegetable or synthetic origin, for example peanut oil, soybean oil, mineral oil, sesame oil, and the like. In general, glycols such as propylene glycol or polyethylene glycols are preferred liquid carriers, particularly for injectable solutions.

Oral administration can be in a suitable suspension or syrup, in which the active ingredient ordinarily will constitute from about 0.5 to 10 percent and preferably about 1 to 5 percent, by weight. The pharmaceutical carrier in such composition can be a watery vehicle such as an aromatic water, a syrup, or a pharmaceutical mucilage.

Suitable pharmaceutical carriers are described in "Remington's Pharmaceutical Sciences" by E. W. Martin, a well known reference text in this field.

The following Examples further illustrate the present invention:

EXAMPLE 54

A large number of unit capsules are prepared by filling standard two-piece hard gelatin capsules weighing about 50 milligrams each with 25 milligrams of powdered 2-benzyl-dicycloheptano[e,g]3a,3b,13a,13b-tetrahydroisoindoline hydrochloride, 125 milligrams of lactose and 1 milligram of "Cab-o-sil."

EXAMPLE 55

Soft gelatin capsules can be prepared if the powdered 2-benzyl-dicycloheptano[e,g]3a,3b,13a,13b-tetrahydroisoindoline (free base) is first dissolved in soybean oil. The solution is then injected by means of a positive displacement pump into gelatin to form the capsules.

EXAMPLE 56

Example 54 is repeated, except that the dosage unit is 50 milligrams of active ingredient, 3.8 milligrams of gelatin, 3.8 milligrams of magnesium stearate, 61.1 milligrams of lactose, 6.3 mg. microcrystalline cellulose, and 3.8 mg. of cornstarch, mixed and formed into a tablet by a conventional tableting machine. Slow release pills or tablets can also be made, by applying appropriate coatings. A sugar coating can be applied to increase palatability.

A large variety of compositions according to this invention can thus readily be made by substituting other compounds of this invention, and including specifically but not limited to compounds of this invention that have specifically been named hereinbefore. The compounds will be used in the amounts indicated in accordance with procedures well known and described in the Martin text mentioned above.

The disclosure herein should not be taken as a recommendation to use the disclosed invention in any way without full compliance with U.S. Food and Drug laws and other laws and governmental regulations which may be applicable.

I claim:
1. A compound selected from 2-benzyl-dicycloheptano[e,g]3a,3b,13a,13b-tetrahydroisoindoline and its addition salts with nontoxic acids.
2. 2-Benzyl-dicycloheptano[e,g]3a,3b,13a,13b-tetrahydroisoindoline, the compound of claim 1.
3. 2-Benzyl-dicycloheptano[e,g]3a,3b,13a,13b-tetrahydroisoindoline hydrochloride, the compound of claim 1.

* * * * *